A. V. RYDER.
Seed Planter.
No. 69,710.  Patented Oct. 8, 1867.
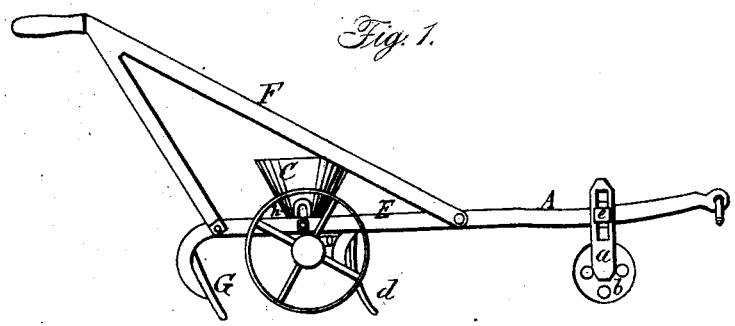
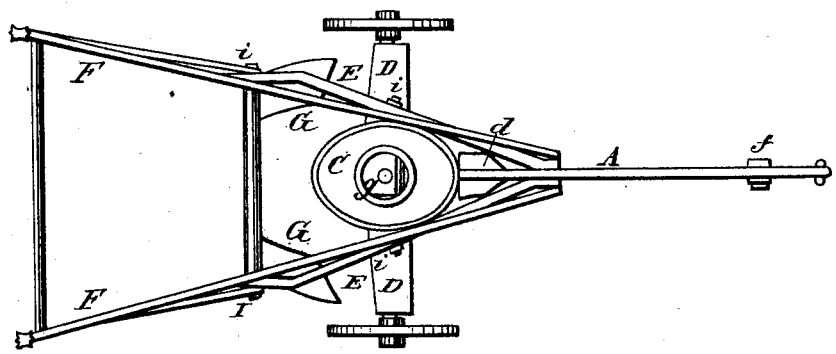
Witnesses:
F. Lehmann
Jno. R. Eulis
Inventor:
A V Ryder
Per
J. H. Alexander & Co
attys

United States Patent Office.

ANDREW V. RYDER, OF GERMANO, OHIO.

Letters Patent No. 69,710, dated October 8, 1867.

IMPROVEMENT IN SEEDING MACHINES.

*The Schedule referred to in these Letters Patent and making part of the same.*

TO ALL WHOM IT MAY CONCERN:

Be it known that I, ANDREW V. RYDER, of Germano, county of Harrison, and State of Ohio, have invented certain new and useful Improvements in Seeding Machines; and I do hereby declare that the following is a full, clear, and exact description of the same, reference being had to the accompanying drawings, and to the letters of reference marked thereon, in which—

Figure 1 is a side elevation,

Figure 2 a plan view,

Figure 3 a view of the revolving seed-box, and

Figure 4 a plan of the reversible shovel.

To enable others skilled in the art to make and use my invention, I will now describe its construction and operation.

A represents the beam, which is so curved downward at its rear end as to form the standard of the shovel $d$. This shovel is reversible, and is constructed as shown in fig. 4. $a$ represents a slotted bar to which is secured the wheel $b$. The object of this slotted bar is to regulate the depth of the furrow, and is held in position by means of screw-bolt $e$ and nut $f$, partially shown in fig. 2. $g$ is a revolving seed-box secured on and at the centre of axle B. Said box is provided with a sufficient number of round holes which act as discharge-spouts. In these holes are regulating-screws, as seen in fig. 2, and are designed for the purpose both of regulating the number of grain or seed deposited and the distance from hill to hill. C represents the hopper in which the grain is placed. D is a bed-piece upon which the hopper C rests. Said bed-piece is provided with slotted ears $h\ h$, one of which is seen in fig. 1, the object of which will be presently explained. The under side of this bed-piece is provided with rings through which the axle B extends. E E represent beams and F F handles, both formed and bolted together, as fully shown in figs. 1, 2. $i\ i$ are screw-bolts passing through beams E E and slotted ears $h\ h$. G G represent ploughs secured to the rear ends of beams E E. Thus it will be seen that these ploughs may be regulated by means of the slotted ears $h\ h$. It will be observed also that with my arrangement I have a complete seeding machine or a complete cultivator.

Having thus described my invention, what I claim, is—

1. The bed-piece D provided with ears $h\ h$, as and for the purpose described.

2. The revolving seed-box $g$, bed-piece D, slotted upright or bar $a$, beams A and E E, and hopper C, all constructed and combined as and for the purpose described.

In testimony that I claim the foregoing as my own I hereby affix my signature in the presence of two witnesses.

ANDREW V. RYDER.

Witnesses:
C. McMILLAN,
THOMAS MOORE.